(12) United States Patent
Yamanaka

(10) Patent No.: US 9,298,024 B2
(45) Date of Patent: Mar. 29, 2016

(54) SEMICONDUCTOR MACH-ZENDER MODULATOR AND METHOD TO DRIVE THE SAME

(71) Applicant: SUMITOMO ELECTRIC INDUSTRIES, LTD., Osaka-shi, Osaka (JP)

(72) Inventor: Shingo Yamanaka, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 233 days.

(21) Appl. No.: 13/709,386

(22) Filed: Dec. 10, 2012

(65) Prior Publication Data

US 2013/0182992 A1   Jul. 18, 2013

(30) Foreign Application Priority Data

Dec. 12, 2011   (JP) ................................. 2011-271356

(51) Int. Cl.
  *G02F 1/035*   (2006.01)
  *G02F 1/225*   (2006.01)
(52) U.S. Cl.
  CPC ............... *G02F 1/035* (2013.01); *G02F 1/225* (2013.01); *G02F 2201/126* (2013.01); *G02F 2201/18* (2013.01)
(58) Field of Classification Search
  CPC ............ G02F 2001/212; G02F 2001/217; G02F 1/2257; G02F 1/01; G02F 1/011; G02F 1/0128; G02F 1/035; G02F 2203/20; H04B 10/50577; H04B 10/505; H04B 10/548
  USPC .................. 385/1–3; 359/237–238, 245, 254
  See application file for complete search history.

(56) References Cited

U.S. PATENT DOCUMENTS

| 5,119,447 A * | 6/1992 | Trisno ............................... 385/3 |
| 6,552,624 B2 * | 4/2003 | Fuerst .................. G02F 1/0123 332/106 |
| 6,912,079 B2 * | 6/2005 | Liu ............................... 359/279 |
| 7,876,491 B2 * | 1/2011 | Ide et al. ....................... 359/279 |
| 8,023,776 B2 * | 9/2011 | Tsunoda ................. G02F 1/225 385/2 |
| 8,340,532 B2 * | 12/2012 | Miyasaka .......... H04B 10/5053 398/202 |
| 8,428,183 B2 * | 4/2013 | Khatana ................ H04L 27/364 332/102 |

(Continued)

FOREIGN PATENT DOCUMENTS

| JP | 9-90301 A | 4/1997 |
| JP | 2008-122786 | 5/2008 |
| JP | 2011-44906 A | 3/2011 |

OTHER PUBLICATIONS

"Implementation Agreement for Integrated Polarization Multiplexed Quadrature Modulated Transmitters", Optical Internetworking Forum, Mar. 12, 2010, pp. 1-20.

(Continued)

*Primary Examiner* — Ryan Lepisto
*Assistant Examiner* — Guy Anderson
(74) *Attorney, Agent, or Firm* — Smith, Gambrell & Russell, LLP

(57) ABSTRACT

A Mach-Zehnder (MZ) modulator made of semiconductor material and a method to drive the MZ-modulator are disclosed. The MZ-modulator includes a pair of arms to vary the phase of the optical beam propagating therein. One of the arms further provides the phase presetter that varies the phase of the optical beam by $\pi$. The arms are driven by modulation signals complementary to each other but with the DC bias equal to each other.

15 Claims, 14 Drawing Sheets

(56) References Cited

U.S. PATENT DOCUMENTS

| | | | |
|---|---|---|---|
| 8,620,115 B2* | 12/2013 | Webster | G02F 1/2257 385/1 |
| 8,638,486 B2* | 1/2014 | Matsuda | G02F 1/0123 359/259 |
| 8,705,900 B2* | 4/2014 | Goh | G02F 1/0121 385/2 |
| 2009/0086303 A1* | 4/2009 | Ide et al. | 359/279 |
| 2010/0142964 A1* | 6/2010 | Chang et al. | 398/116 |
| 2011/0026935 A1* | 2/2011 | Akiyama | H04B 10/5053 398/184 |
| 2011/0064351 A1 | 3/2011 | Kise et al. | |
| 2011/0222813 A1* | 9/2011 | Webster | G02F 1/2257 385/3 |
| 2013/0182992 A1* | 7/2013 | Yamanaka | G02F 1/035 385/3 |
| 2014/0023310 A1* | 1/2014 | Katou | G02B 6/29352 385/3 |

OTHER PUBLICATIONS

Masaharu Doi et al., "40 Gb/s Low-drive-voltage $LiNbO_3$ Optical Modulator for DQPSK Modulation Format", Optical Fiber Conference (OFC), 2007, 3 sheets.

Notice of Reasons for Rejection issued on Sep. 1, 2015 for Application No. P2011-271356 w/ English language translation.

* cited by examiner

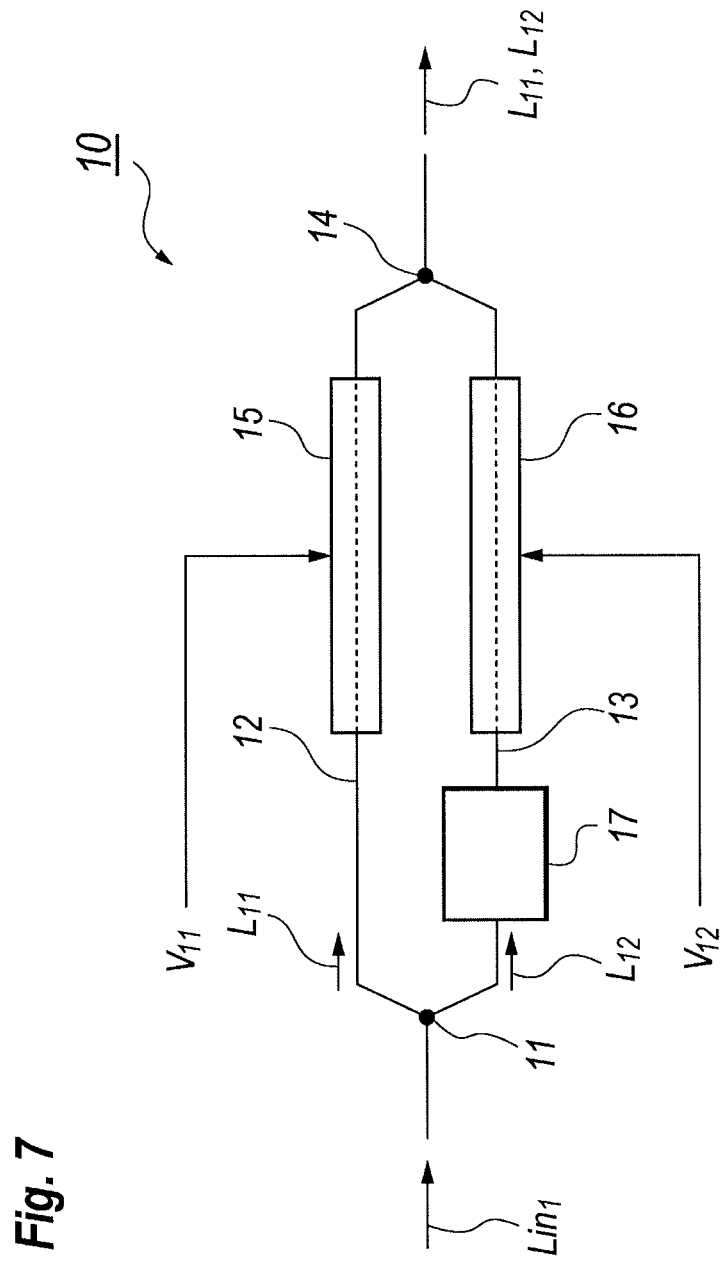

US 9,298,024 B2

SEMICONDUCTOR MACH-ZENDER MODULATOR AND METHOD TO DRIVE THE SAME

BACKGROUND OF THE INVENTION

1. Field of the Invention

The present application relates to a method to drive a Mach-Zehnder modulator (hereafter denoted as MZ-modulator), in particular, the application relates to a method to drive a semiconductor MZ-modulator.

2. Related Background Arts

Many prior arts have disclosed an MZ-modulator that provides an input optical waveguide to guide an input optical beam, a branch to divide the input optical beam into two beams, a pair of phase modulators each coupled with the branch, an optical coupler to couple two beams each divided by the optical branch and propagated in the phase modulators into a composite optical beam, and an output optical waveguide to guide the composite optical beam. These members of the input optical waveguide, the optical branch, the phase modulators, the optical coupler, and the output optical waveguide, are monolithically integrated on a substrate. Each of the phase modulators has an equivalent refractive index different from others. The phase difference between optical beams each propagating in the phase modulators are given by $(2n+1) \times \pi$, where n is zero or positive integers, under a condition of no modulation signal. That is, two optical beams each output from the phase modulators countervail to each other under such a condition, which results in no optical output from the MZ-modulator.

As the volume to be transmitted by the optical communication system explosively increases, an additional technique fundamentally different from the conventional magnitude modulation has been requested. The optical QPSK (Quadrature Phase Shift Keying) technique is one of the solutions for such requests. A transmitter operable in the QPSK mode includes a laser diode (LD) as an optical source and an optical phase modulator to modulate the optical beam emitted from the LD by the QPSK mode. The QPSK modulator is constituted by a pair of MZ-modulators. However, when the MZ-modulator is made of semiconductor material, various subjects to be solved have been known.

SUMMARY OF THE INVENTION

One aspect of the present application relates to a MZ-modulator made of semiconductor material. The MZ-modulator includes an optical branch, a pair of arm waveguides, a phase presetter, and an optical coupler. The optical branch divides an input optical beam into two optical beams each provided to respective arm waveguides. The phase presetter is put in one of arm waveguides, and varies a phase of the optical beam propagating therein by $\pi$. The optical coupler couples the optical beam propagating in the arm waveguide without the phase presetter with the other optical beam propagating in the other arm waveguide with the phase presetter. The arm waveguides are driven by modulation signals accompanied with biases. A feature of the MZ-modulator of the invention is that the modulation signals are complementary to each other with a swing range substantially same to each other and the biases are also substantially same to each other Because the phase presetter shifts the phase of the optical beam propagating therein by $\pi$, the arm waveguide without phase presetter modulates the phase of the optical beam in a range from 0 to $\pi$ responding to the modulation signal from $V(0)$ to $V(\pi)$; while, the arm waveguide with the phase presetter modulates the phase of the optical beam in a range from $2\pi$ to $\pi$ responding to the other modulation signals with the opposite phase from $V(2\pi)$ to $V(\pi)$. Thus, two modulation signals have the swing range and the bias same to each other. According to the MZ-modulator of the present application, even the MZ-modulator is made of semiconductor material that inevitably shows the non-linearity of the phase variation against the bias provided thereto, the driving conditions may be simplified.

The phase pre setter provides an optical waveguide with an electrode, namely, an arrangement same with that of the arm waveguide. Providing a bias $V(\pi)$, where $V(\pi)$ means a voltage corresponding to the phase shift of an optical beam propagating therein by $\pi$, to the electrode, the equivalent refractive index of the optical waveguide is varied, which means that the optical length thereof varies and the phase of the optical beam passing therethrough is also varied. In an altered example, the phase presetter includes only an optical waveguide whose physical length is varied by a length corresponding to the phase shift of the optical beam propagating therein by $\pi$.

BRIEF DESCRIPTION OF THE DRAWINGS

The foregoing and other purposes, aspects and advantages will be better understood from the following detailed description of a preferred embodiment of the invention with reference to the drawings, in which:

FIG. 7 is a plan view schematically showing a fundamental arrangement of the MZ-modulator made of semiconductor material;

DETAILED DESCRIPTION OF PREFERRED EMBODIMENTS

Next, some preferred embodiments according to the present invention will be described as referring to drawings. In the description of the drawings, numerals or symbols same or similar to each other will refer to elements same or similar to each other without overlapping explanations.

Figure 1:
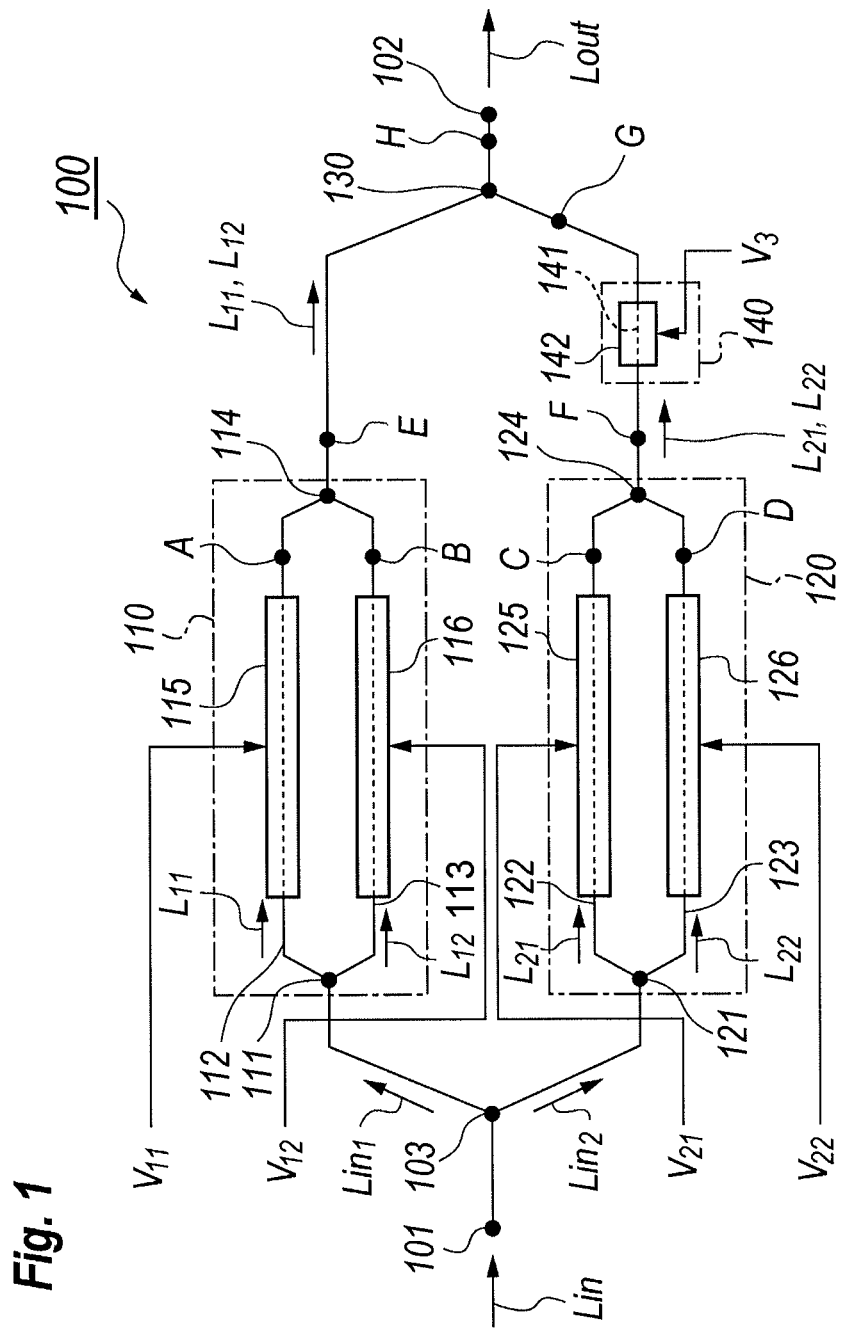
FIG. 1 is a plan view of an optical modulator according to a comparable embodiment.

FIG. 1 is a plan view of a QPSK modulator according to a comparable embodiment. The QPSK modulator 100 shown in FIG. 1 includes an input terminal 101 to input an optical beam Lin to be modulated, and an output terminal 102 to output an optical beam Lout modulated by the modulation signals, $V_{11}$ to $V_{22}$. The input terminal 101 couples with an optical branch 103 that divides the optical beam Lin into two optical beams $Lin_1$ and $Lin_2$.

One of the outputs of the optical branch 103 couples with the first MZ-modulator 110 that modulates the optical beam $Lin_1$ by the BPSK (Binary Phase Shift Keying) mode where the optical beam output from the first MZ-modulator 110 has two phase statuses of 0 (rad) and Π (rad) each corresponding to the bits "0" and "1". Here, the phase statuses of 0 (rad) and Π (rad) are relative conditions which merely means that assuming the phase status corresponding to bit "0" is 0 (rad), the phase status for bit "1" is shifted by Π (rad).

Specifically, the optical beam $Lin_1$ output from the optical branch 103 is further divided into two optical beams, $L_{11}$ and $L_{12}$, by the optical branch 111, where the former optical beam $L_{11}$ propagates within the optical waveguide 112; while, the latter optical beam $L_{12}$ propagates in the optical waveguide 113. When the bit status "0" is required, a bias $V_{11}$ to advance the phase of the optical beam $L_{11}$ forward while another bias $V_{12}$ to advance the phase of the other optical beam $L_{12}$ backward are provided to respective electrodes, 115 and 116; which realizes the phase of 0(rad) in the composite optical beam. On the other hand, when the bit status "1" is required, the signal $V_{11}$ to advance the phase of the optical beam $L_{11}$ backward while the other signal $V_{12}$ to advance the phase of the optical beam $L_{12}$ forward are provided to respective electrodes, 115 and 116. Thus, the composite optical beam output from the MZ-modulator 110 shows the phase status of π(rad).

In an exemplary condition, when the bit status "0" is required, no biases are provided to the electrodes, 115 and 116, which maintains the phase of the optical beams, $L_{11}$ and $L_{12}$, same as that of the optical beam $Lin_1$. While, when the bit status "1" is required, the signal $V_{11}$ to advance the phase of the optical beam $L_{11}$ forward by π(rad), while, the other signal $V_{12}$ to advance the phase of the optical beam $L_{12}$ backward by π(rad) are provided to respective electrodes, 115 and 116.

The other of the outputs of the optical branch 103 couples with the second MZ-modulator 120. The second MZ-modulator 120 also modulates the second optical beam $Lin_2$ by the BPSK mode. That is, the optical beam $Lin_2$ is further divided into two beams, $L_{21}$ and $L_{22}$, each propagating within the optical waveguides, 122 and 123. Two signals, $V_{21}$ and $V_{22}$, to advance the phases of two beams, $L_{21}$ and $L_{22}$, forward and backward, are provided to the electrodes, 125 and 126, respectively, when the bit status "0" is required. On the other hand, when the bit status "1" is required, signals, $V_{21}$ and $V_{12}$, to advance the phase backward and forward are provided to the electrodes, 125 and 126. The optical coupler 124 coupled with the waveguides, 122 and 123, merges two optical beams, $L_{21}$ and $L_{22}$, to form the composite optical beam.

The output of optical coupler 114 in the first MZ-modulator 110 directly couples with one of inputs of the optical coupler 130; while, the output of the optical coupler 124 in the second MZ-modulator 120 couples with the other of inputs of the optical coupler 130 via the phase shifter 140. The phase shifter 140, which includes an optical waveguide 141 and an electrode 142 provided on the optical waveguide 141, causes the phase shift by π/2(rad) for the composite optical beam passing therethrough by providing a bias $V_3$ on the electrode 142.

The output of the optical coupler 130 is guided to the output terminal 102. The optical beams, $L_{11}$ and $L_{12}$, output from the optical coupler 114, and other two optical beams, $L_{21}$ and $L_{22}$, output from the phase shifter 140 are combined by the optical coupler 130 and output from the output terminal 102 as the optical output Lout modulated by the QPSK mode.

Figure 2:
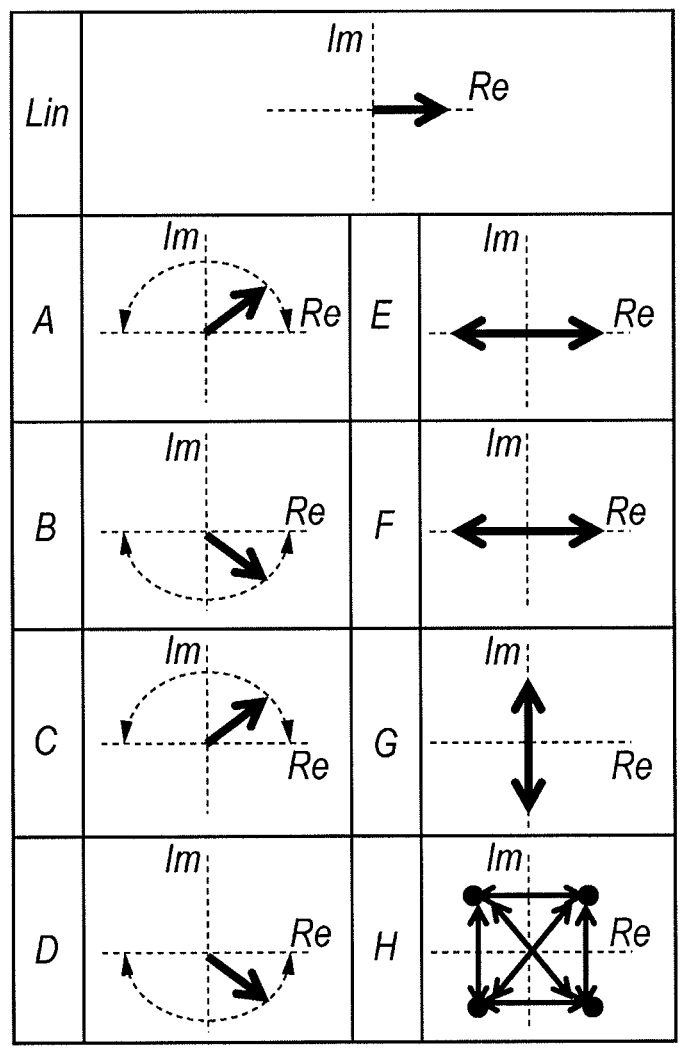
FIG. 2 is the polar displays of the optical beams measured at the optical input terminal and points A to H marked in FIG. 1.

FIG. 2 is the polar displays of the optical beams measured at the optical input terminal 103 and nodes A to H marked in FIG. 1. The input optical beam Lin, as shown in FIG. 2, has the single phase, which assumed to be the reference phase of 0 (rad), but two optical beams, $L_{11}$ and $L_{12}$, divided from the input optical beams Lin varies the phase thereof along the respective dotted line in FIG. 2 as a result of the BPSK modulation. Specifically, the phase of the optical beam $L_{11}$ measured at the end A of the optical waveguide 112 varies from 0 to +π along the dotted line in the upper half plane; while, that of the optical beam $L_{12}$ measured at the end B of the other optical waveguide 113 varies from 0 to −π along the dotted line in the lower half plane. Similarly, the optical beams, $L_{21}$ and $L_{22}$, measured at the ends, C and D, of the optical waveguides, 122 and 123, vary the phase thereof between 0 and π(rad).

Then, the phase measured at the end E of the optical coupler 114, which is a composite of two beams, $L_{11}$ and $L_{12}$, shows two phase statuses of 0(rad) and π(rad); also, the phase measured at the end F of the optical couple 124 show two phase statuses of 0(rad) and π(rad), both of them have the configuration of BPSK mode.

The second MZ-modulator 120 accompanies with the phase shifter 140 in downstream thereof. Because the phase shifter 140 shifts the phase of the composite optical beam by π/2(rad), the phase measured at the output G of the phase shifter 140 becomes that shown in FIG. 2. Finally, the phase measured at the output H of the optical coupler 130 has four phase statuses of π/4, 3π/4, 5π/4, and 7π/4, which configures the QPSK mode.

The first and second MZ-modulators, 110 and 120, in particular, the waveguides, 112 to 123, provided therein are sometimes made of semiconductor material such as InP, GaAs, and so on because of large electro-optical effect inherently attributed to those materials. For instance, an optical waveguide including, what is called, the multiple quantum well (MQW) structure show large variation in the refractive index thereof by the quantum confined stark effect, which means that large phase shift may be obtained by applying relatively small bias to the waveguide. However, such large variation of the refractive index accompanies with large optical loss by the optical absorption.

Figure 3:
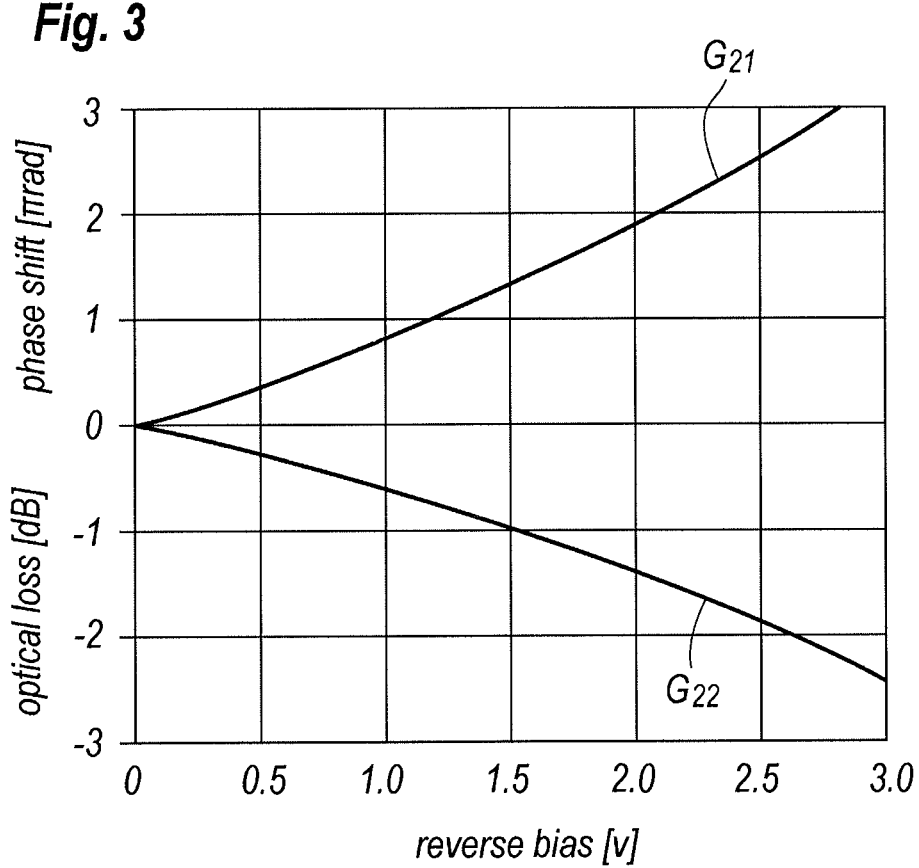
FIG. 3 shows a relation of the phase shift and the optical loss against the bias of an optical waveguide made of semiconductor material.

FIG. 3 shows a typical behavior of the phase shift and the optical loss against the reverse bias applied to an optical waveguide made of semiconductor material, where a behavior $G_{21}$ corresponds to the phase shift against the reverse bias; while, a behavior $G_{22}$ shows the optical loss against the reverse bias. As FIG. 3 clearly shows, the phase shift $G_{21}$ and the optical loss $G_{22}$ show relations non-linear to the reverse bias. This non-linear dependence causes the following subject to be solved.

Figure 4A:
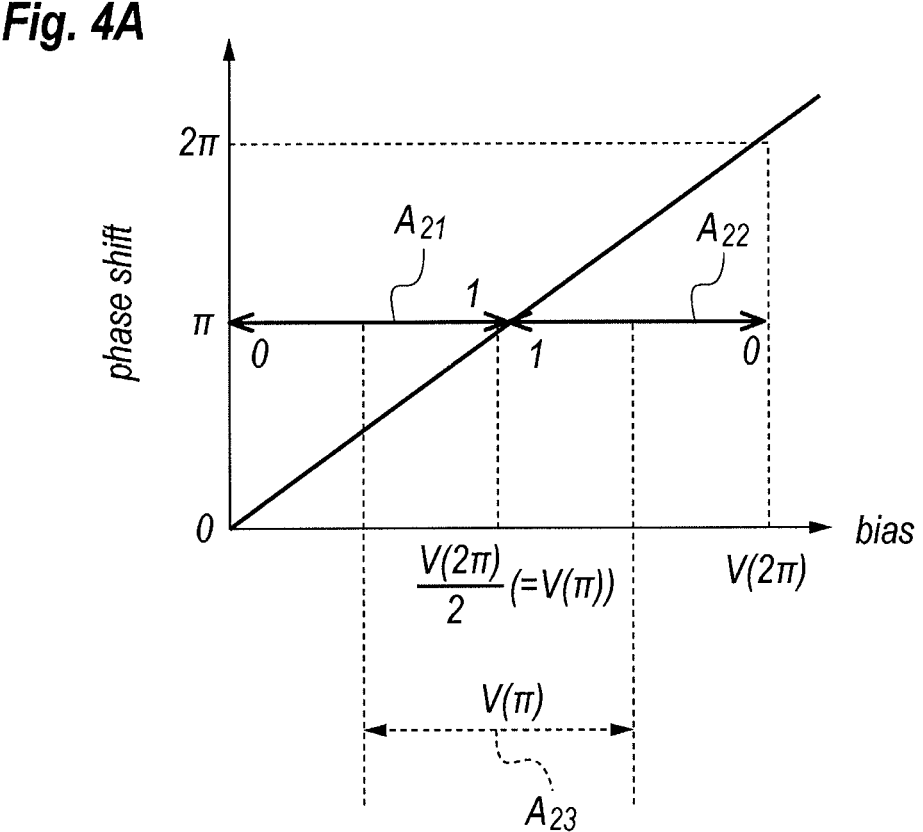
FIG. 4A shows the phase shift against the bias observed in an optical waveguide made of dielectric material.
Figure 4B:
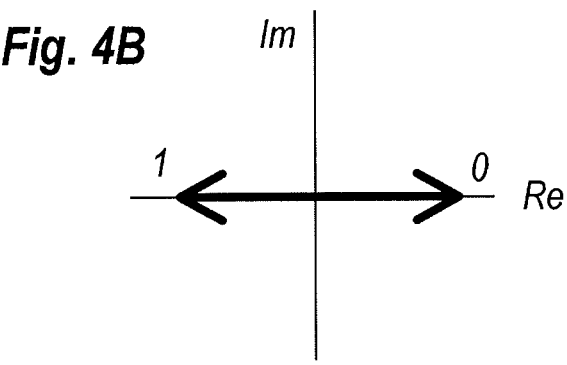
FIG. 4B is a polar display of signal statuses obtained in the optical waveguide having the relation shown in FIG. 4A.

A dielectric material such as lithium niobate ($LiNbO_3$) is first considered, where $LiNbO_3$ shows a linear dependence of the phase shift against the bias, exactly, the electric field applied thereto. When the optical waveguides, 112 and 113, are made of $LiNbO_3$, a relation of the phase status against the biases is shown in FIG. 4A. That is, setting (a) amplitude of the bias provided to the waveguide to be a half of $V(2\pi)$, where $V(2\pi)$ means the bias condition by which the phase of the optical beam advances forward or backward by $2\pi$(rad), (b) setting a static bias condition of the signal $V_{11}$ for the waveguide 112 is $V(\pi/2)$, while, that of the signal $V_{12}$ for the other waveguide 113 is $V(3\pi/2)$, then, (c) applying the signal $V_{11}$ swinging between $V(0)$ and $V(\pi)$ and the other signal $V_{12}$ swinging between $V(2\pi)$ and $V(\pi)$; then two phase statuses of 0(rad) and $\pi$(rad), each corresponding to bit statuses of "0" and "1", for the composite optical beam may be obtained. FIG. 4A is a polar display of such bit statuses.

Figure 5A:
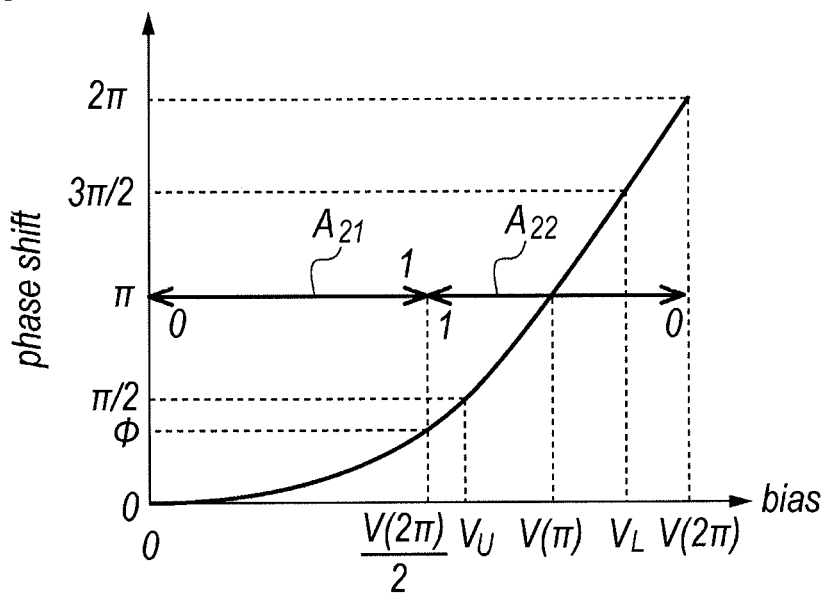
FIG. 5A shows the phase shift against the bias observer in an optical waveguide made of semiconductor material.
Figure 5B:
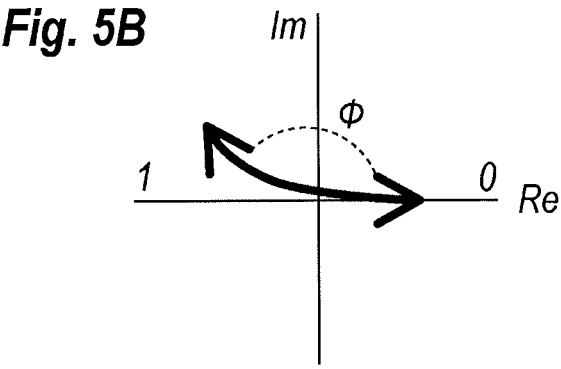
FIG. 5B is a polar display of signal statuses obtained in the optical waveguide shown in FIG. 5B and driven by a mode same with those in FIG. 4B.

On the other hand, when the optical waveguides, 112 and 113, are made of semiconductor materials, which shows the non-linear dependence of the phase shift against the applied bias, the phase status of the composite beam becomes complicated such as shown in FIG. 5A. That is, the phase shift at the condition V (2 Π)/2 no longer becomes Π but $\phi$ less than Π. Even when the static bias conditions, $V_U$ and $V_L$, for the waveguides, 112 and 113, are set so as to cause the phase shift of Π/2 and 3Π/2 as those shown in FIG. 5A and swinging the signals from the static bias conditions described above by the magnitude of ±V(Π/2), the phase statuses of 0 (rad) and Π (rad) cannot be obtained. The waveguide 112 is in a condition of under modulation, while, the waveguide 113 is in a condition of over modulation. FIG. 5B shows two phase statuses, one of which corresponds to a condition when the upper waveguide 112 is set in V(0) while the lower waveguide 113 is set in V(2 Π), which is the phase status of 0 (rad) of the composite beam, the other of which shows a condition when the upper and lower waveguides are set in V(2 Π)/2. Under such signal conditions, the upper waveguide 112 advances the phase of the optical beam propagating therein forward by $\phi$ but less than Π, while, the lower waveguide 113 advances the phase backward by 2 Π-$\phi$, which is greater than Π. Then, the polar display of the condition above becomes as that shown in FIG. 5B, where the bit status corresponding to Π (rad) becomes offset from the real axis. It would be so hard to find adequate conditions for the initial conditions and swing magnitudes for respective biases, $V_{11}$ and $V_{12}$.

Figure 6A:
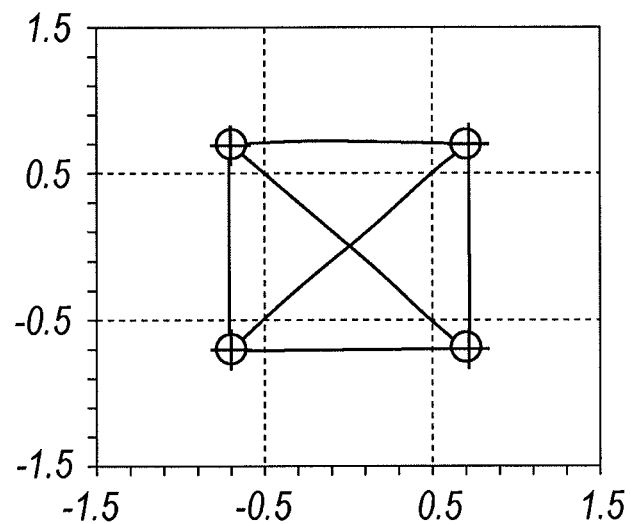
FIGS. 6A and 6B compare the constellation of the composite beam output from a MZ-modulator made of dielectric material (FIG. 6A) and that made of semiconductor material (FIG. 6B)
Figure 6B:
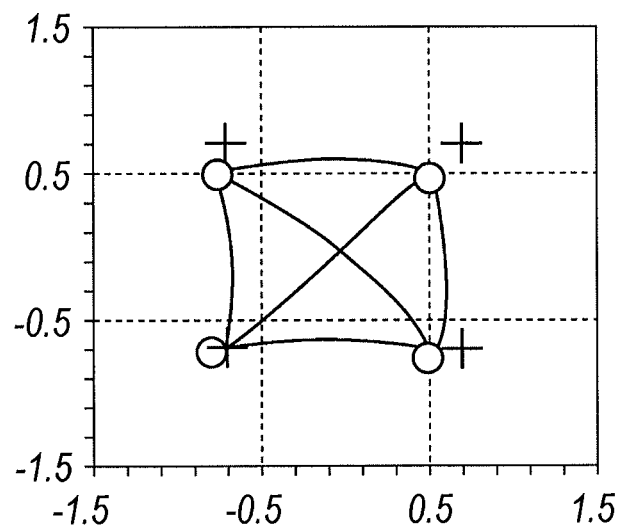

FIGS. 6A and 6B compare the constellation of the composite beam output from the QPSK modulator made of dielectric material (FIG. 6A) and that made of semiconductor material (FIG. 6B). Crosses appearing in these figures correspond to theoretical positions for the composite optical beam when the optical beams, $L_{11}$ to $L_{22}$, are caused in the phase shift of exactly Π/2. When a waveguide shows the linear dependence of the phase shift against the bias as those of the dielectric waveguide, the optical beams, $L_{11}$ to $L_{22}$, are caused in the phase shift with a span of substantially Π/2. On the other hand, a waveguide made of semiconductor material shows the constellation whose phase difference is deformed from Π/2.

First Embodiment

Next, a first embodiment of an MZ-modulator according to the present invention will be described in detail. FIG. 7 is a plan view schematically showing a fundamental arrangement of the MZ-modulator made of semiconductor material. The MZ-modulator 10 shows the function of BPSK mode with the phase statuses of 0(rad) and $\pi$(rad) each corresponding to the bit statuses of "0" and "1". The MZ-modulator 10 includes an optical branch 11, a pair of optical waveguides, 12 and 13, which are hereafter called as the arm waveguides, each optically coupled with respective outputs of the optical branch 11, and an optical coupler 14 coupled with the other end of respective arm waveguides, 12 and 13. The optical branch 11 and the optical coupler 14 are a type of, what is called, the multi-mode interference (MMI) coupler. Two arm waveguides, 12 and 13, provide electrodes, 15 and 16, to be provided with modulation signals with static biases thereto that modulate the refractive index of the arm waveguides, 12 and 13. The variation of the refractive index results in a change of the optical length which brings the shift of the phase of the optical beam propagating therein at the end thereof.

The MZ-modulator 10 of the embodiment further provides the phase presetter 17 in only one of the arm waveguides, where the present embodiment provides the phase presetter 17 in the lower arm waveguide 13. The phase of the optical beam propagating in the arm waveguide 13 is further shifted by the signal applied to the phase presetter 17. In an example, the phase presetter 17 includes an optical waveguide made of semiconductor material, such as GaAs, InP, and so on, and an electrode to provide an electrical signal to the arm waveguide 13. Applying the signal to the electrode of the phase presetter 17; the phase of the optical beam propagating therein shifts by Π (rad). In another example, the phase presetter 17 includes an optical waveguide without any electrodes, which is called as the supplemental waveguide. The supplemental waveguide lengthens the optical length of the arm waveguide 13 longer than that of the upper arm waveguide 12 by a length corresponding to a phase of Π, which results in a phase shift of Π (rad). However, the arrangement of the phase presetter 17 is not restricted to those described above. The phase shift by Π between two optical beams propagating in respective arm waveguides, 12 and 13, is the only condition requested of the phase presetter 17.

The operation of the MZ-modulator 10 will be described. Entering an input optical beam $Lin_1$ into the MZ-modulator 10, the input optical beam $Lin_1$ is divided into two optical beams, $L_{11}$ and $L_{12}$, by the optical branch 11. One of the optical beams $L_{11}$ enters the one of the arm waveguides 12, while, the other optical beam $L_{12}$ enters the other arm waveguide 13, propagates therein, and enters the phase presetter 17. The phase presetter 17 causes the phase shift by $\pi$ only for the optical beam $L_{12}$. Thus, two optical beams, $L_{11}$ and $L_{12}$, are caused in the phase difference therebetween by $\pi$ (rad) at the output of the phase presetter 17.

The optical beam $L_{12}$ output from the phase presetter 17 further propagates in the arm waveguide 13 as shifting the phase thereof by the signal $V_{12}$ provided to the electrode 16. On the hand, the other optical beam $L_{11}$ propagates in the other arm waveguide 12 as shifting the phases thereof. When the composite optical beam output from the MZ-modulator 10 corresponds to the bit status "0"; two signals, $V_{11}$ and $V_{12}$, causing the phase difference of 0(rad) between two beams, $L_{11}$ and $L_{12}$, are provided to respective electrodes, 15 and 16. While, when the bit status "1" is required, two signals, $V_{11}$ and $V_{12}$, causing the phase shift by $\pi$ (rad) relative to the phase status of 0(rad) above described are provided to the electrodes, 15 and 16.

Figure 8A:
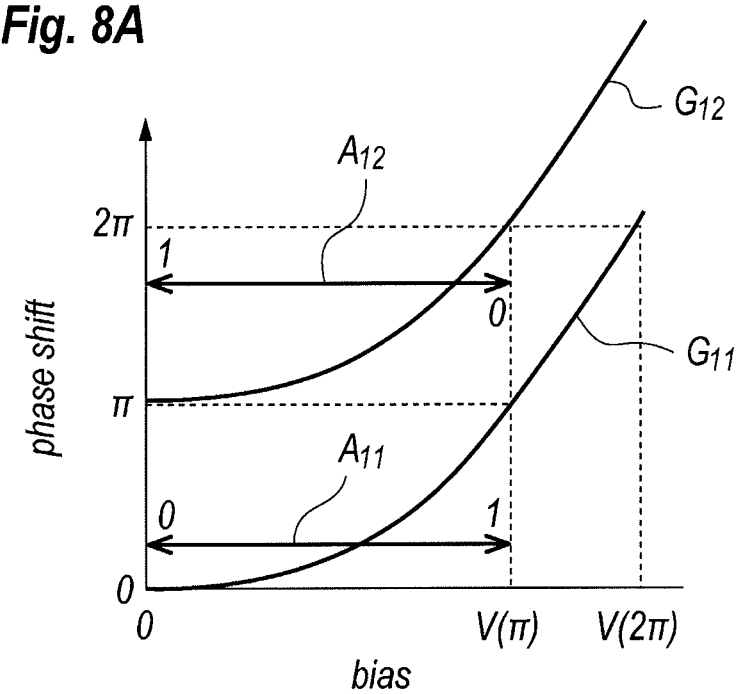
FIG. 8A shows the phase variation against the bias of the MZ-modulator 10.
Figure 8B:
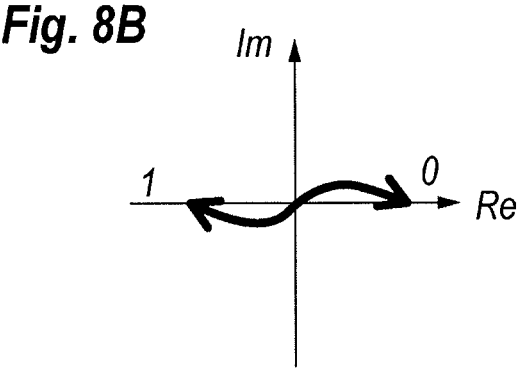
FIG. 8B is a polar display of output statuses of the MZ-modulator of the present embodiment.

FIG. 8A shows the phase shift against the signal applied to the MZ-modulator 10, and FIG. 8B is a polar display of output statuses of the MZ-modulator 10. In FIG. 8A, a behavior $G_{11}$ denotes the phase shift of the upper arm waveguide 12, while, another behavior $G_{12}$ denotes the phase shift of the lower arm waveguide 13. An arrow $A_{11}$ shown in FIG. 8A denotes the swing range of the signal $V_{11}$ for the upper arm waveguide 12, and the other arrow $A_{12}$ indicates the swing range of the other signal $V_{12}$ for the lower arm waveguide 13.

As shown in FIG. 8A, two signals, $V_{11}$ and $V_{12}$, have the swing range, or the amplitude, same to each other, which is equal to be $V(\pi)$. When the signal $V_{11}$ is set to be 0, while the other signal $V_{12}$ is set to be $V(\pi)$; then, the optical beam $L_{12}$ shifts the phase by $\pi$ by the signal $V_{12}$ in addition to the phase shift of $\pi$ caused by the phase presetter 17, namely, the total phase shift becomes $2\pi$. Because the optical beam $L_{11}$ causes no phase shift, the composite optical beam output from the coupler 14 becomes the phase status of 0(rad). On the other hand, when the composite optical beam shows the phase status of $\pi$(rad), the signal $V_{11}$ for the upper arm waveguide 12 is set to be $V(\pi)$; while, the other signal $V_{12}$ for the lower arm waveguide 12 is set to be 0 to cause no phase shift therein, but the phase presetter 17 causes the phase shift of $\pi$, then the composite optical beam output from the coupler 14 shows the phase status of $\pi$(rad). Thus, the BPSK modulation may be performed.

The MZ-modulator 10 of the present embodiment provides the phase presetter 17 to shift the phase of the optical beam passing therethrough by $\pi$, then, the optical beam $L_{12}$ propagating in the lower arm waveguide 13 varies the phase thereof between $\pi$ and $2\pi$ responding to the signal $V_{12}$ swinging between $V(\pi)$ and 0. On the other hand, the phase shift of the other optical beam $L_{11}$ propagating in the upper arm 12 is between 0 and $\pi$ for the signal $V_{11}$ swinging between 0 and $V(\pi)$. When two signals, $V_{11}$ and $V_{12}$, are complementary to each other, that is, when the signal $V_{11}$ is in 0, then, the other signal $V_{12}$ becomes $V(\pi)$, the phase status of 0(rad) may be obtained for the composite optical beam. On the other hand, when the signal $V_{11}$ becomes $V(\pi)$, then, the other signal is set to be 0, the phase status of $\pi$(rad) may be realized in the composite optical beam.

FIG. 8B is the polar display of the composite optical beam output from the optical coupler 14. The polar display of FIG. 8B is distinguishable from that of FIG. 5B, that is, the phase status of $\pi$(rad) shows the phase difference of exactly $\pi$ from the phase status of 0(rad). Thus, the non-linearity of the phase shift of the arm waveguides, 12 and 13, made of semiconductor material can be compensated.

Second Embodiment

Figure 9:
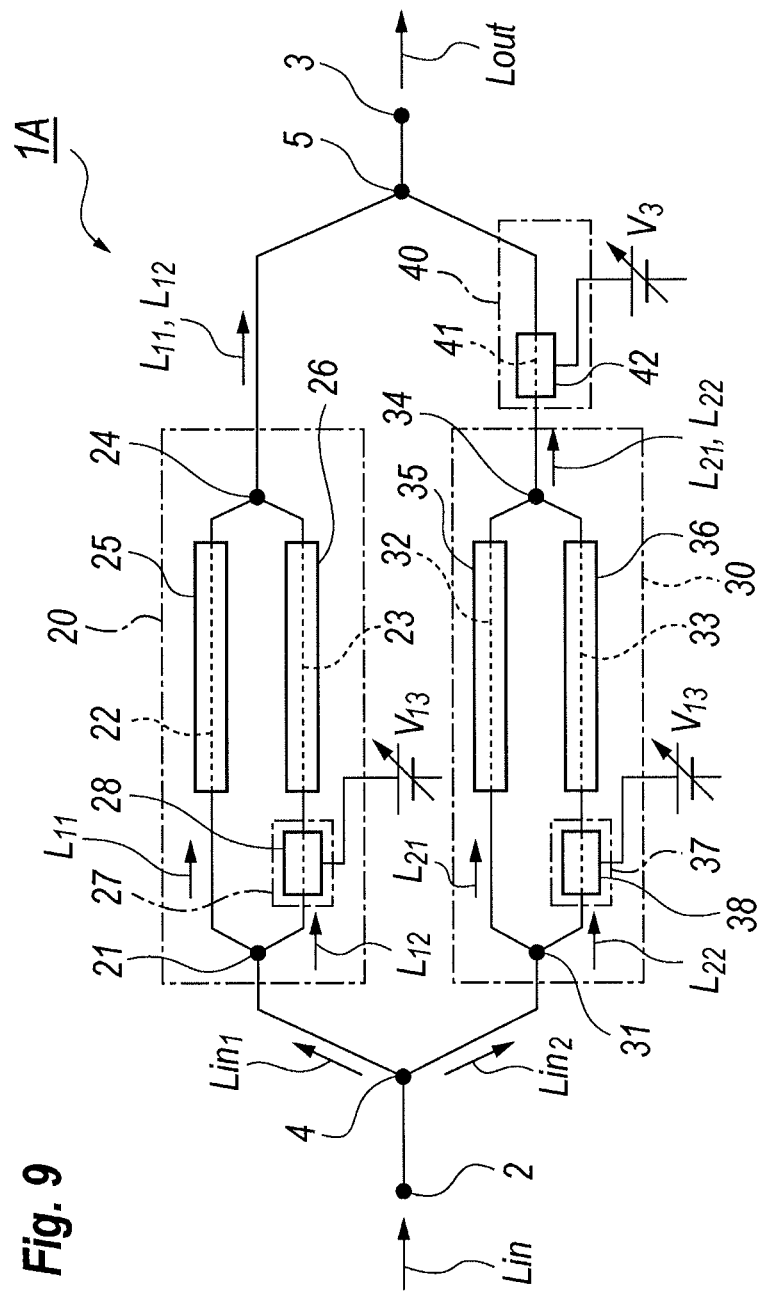
FIG. 9 is a plan view of a QPSK modulator made of semiconductor material according to the second embodiment of the invention.

FIG. 9 is a plan view of a QPSK modulator made of semiconductor material according to the second embodiment of the invention. The BPSK modulator 1A shown in FIG. 9 includes the optical input terminal 2 and the optical output terminal 3. The optical input terminal 2 couples with the optical branch 4 in downstream thereof to divide the input optical beam Lin into two optical beams, $Lin_1$ and $Lin_2$, one of which $Lin_1$ enters the first MZ-modulator 20, while, the other $Lin_2$ enters the second MZ-modulator 30. These MZ-modulators, 20 and 30, have the same arrangement with that shown in FIG. 7. That is, the first MZ-modulator 20 includes the optical branch 21 coupled with the optical branch 4, two arm waveguides, 22 and 23, each coupled with respective outputs of the optical branch 21 and providing electrodes, 25 and 26, and the optical coupler 24 optically coupled with the end of the arm waveguides, 21 and 22. Only the lower arm waveguide 23 provides the phase presetter 27 to shift the phase of the optical beam $L_{12}$ propagating therein by $\pi$. The phase presetter 27 provides the electrode 28 to which the static bias $V_{13}$ is provided to shift the phase of the optical beam $L_{12}$ by $\pi$. The first MZ-modulator 20 can execute the BPSK modulation of the optical beam $Lin_1$ to show the phase statuses of 0(rad) and $\pi$(rad) corresponding to the bit statues of "0" and "1", respectively, by the mechanism same with that of the MZ-modulator 10.

The second MZ-modulator 30 is coupled with the other output of the optical branch 4. The second MZ-modulator 30 also provides the arrangement same with that shown in FIG. 7 and shows the mechanism of the BPSK modulation same with that attributed to the first MZ-modulator 20 and the MZ-modulator shown in FIG. 7.

The first MZ-modulator 20 couples directly with the optical coupler 5; while, the second MZ-modulator 30 couples indirectly with the optical coupler 5 via the phase shifter 40. The phase shifter 40 includes an optical waveguide 41 with an electrode 42. Providing a bias $V_3$ to the waveguide 41 via the electrode 42, the optical beam passing therethrough shifts the phase thereof by $\pi/2$. Then, the optical beams, $L_{21}$ and $L_{22}$, modulated by the second MZ-modulator 30 further shifts the phase thereof by $\pi/2$ with respect to the phases of the optical beams, $L_{11}$ and $L_{12}$, modulated by the first MZ-modulator 20. The composite optical beam Lout merged by the optical coupler 5 and output from the optical output terminal 3 becomes the QPSK signal attributed with four phases of $\pi/4$, $3\pi/4$, $5\pi/4$, and $7\pi/4$.

The QPSK modulator 1A shown in FIG. 9 includes two MZ-modulators, 20 and 30, each configured with the MZ-modulator 10 shown in FIG. 7. The two MZ-modulators, 20 and 30, can output the composite optical beam showing two phase statuses of 0(rad) and $\pi$(rad) with the phase difference of exactly $\pi$. Accordingly, the composite optical beam output from the QPSK modulator 1A can reduce the phase distortion, namely, a phase difference between four phase statuses of $\pi/4$, $3\pi/4$, $5\pi/4$, and $7\pi/4$, to enhance the transmission quality of optical data.

Figure 10:
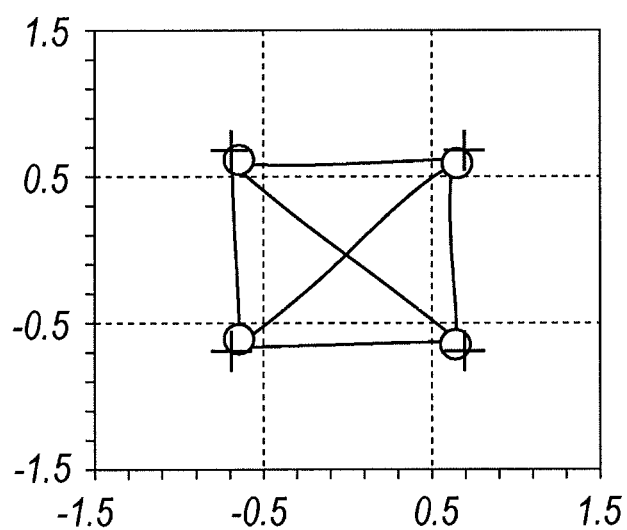
FIG. 10 shows the constellation of the composite optical beam output from the QPSK modulator shown in FIG. 9.

FIG. 10 shows the constellation of the composite optical beam output from the QPSK modulator 1A. Crosses shown in FIG. 10 correspond to the theoretical position of the composite optical beam. The constellation shown in FIG. 10 shows a convergence to the theoretical points. Assuming that a penalty is a ratio of a length from the origin to one of phase statuses farthest from the theoretical point to a length from the origin to the theoretical point, the penalty of the QPSK modulator 1A becomes 1.1 dB, which is comparable of the penalty of 3.9 dB attributed to the QPSK modulator 100 without the phase pre setter.

First Modification

Figure 11:
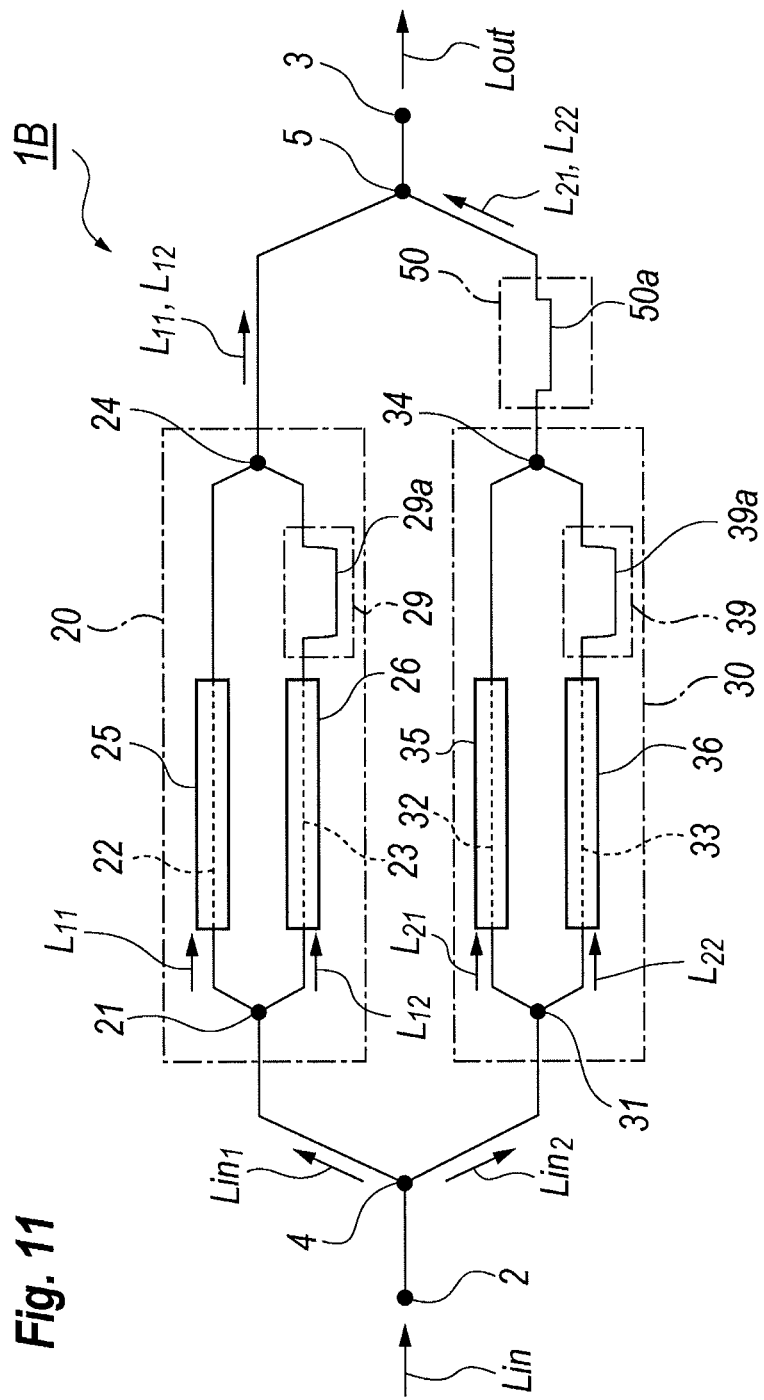
FIG. 11 is a plan view of another QPSK modulator according to a modification of the aforementioned QPSK modulator shown in FIG. 9.

FIG. 11 is a plan view of another QPSK modulator 1B according to a modification of the aforementioned QPSK modulator 1A shown in FIG. 9. The QPSK modulator 1B has features distinguishable from those of the aforementioned QPSK modulator 1A in an arrangement of the phase presetter. That is, the first and second MZ-modulators, 20 and 30, of the present embodiment provides the phase presetters, 29 and 39, instead of the phase presetters, 27 and 37, respectively.

The phase presetter 29 provides an optical waveguide 29a whose optical length is substantially equal to the phase shift of $\pi$. That is, the optical beam $L_{12}$ propagating in the lower arm waveguide 23 and the phase presetter 29 always runs within the waveguide longer than the other waveguide 22 by a length corresponding to the phase shift of $\pi$, which also causes the phase shift by $\pi$ between optical beams, $L_{11}$ and $L_{12}$, each propagating in the upper arm waveguide 22 and the lower arm waveguide 23. Similarly, the phase presetter 39 in the other MZ-modulator 30 shows the function same with that of the phase presetter 29. Accordingly, the optical beams, $L_{21}$ and $L_{22}$, each propagating within respective arm waveguides, 32 and 33, inevitably attribute the phase difference of π.

The QPSK modulator 1B of the present embodiment is also distinguishable from the aforementioned QPSK modulator 1A by the phase shifter 50. This phase shifter 50 includes an optical waveguide 50a to lengthen the optical length of the waveguide, which extends from the output of the optical coupler 34 to the input of the optical coupler 5, by a length corresponding to the phase shift of π/2. Then, the composite optical beam reaching the optical coupler 5 is shifted in the phase thereof by π/2 with respect to the composite optical beam reaching the optical coupler 5.

The QPSK modulator 1B includes the first and second MZ-modulators, 20 and 30, each having the configuration same with that of the MZ-modulator 10 shown in FIG. 7. Accordingly, the first and second MZ-modulators, 20 and 30, may show in the output thereof the phase statuses of 0(rad) and π(rad) with a difference of exactly π. Then, the output of the QPSK modulator 1B may show the four phase statuses of π/4, 3π/4, 5π/4, and 7π/4 to enhance the quality of the optical signal.

Figure 12:
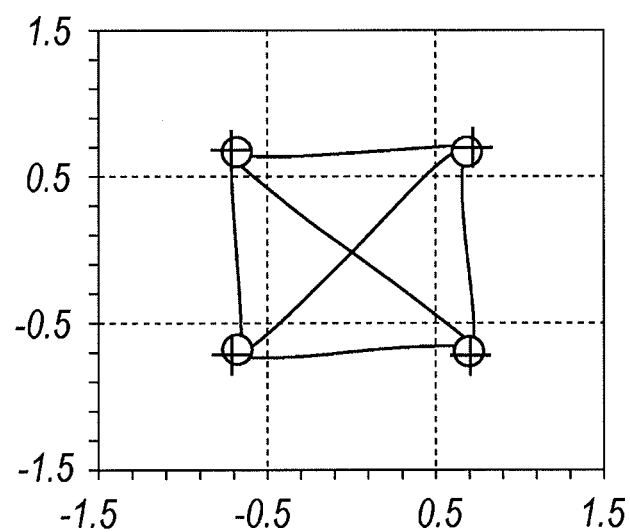
FIG. 12 shows an example of the output constellation of the QPSK modulator shown in FIG. 11.

FIG. 12 shows an example of the output constellation of the QPSK modulator 1B. As shown in FIG. 12, the QPSK modulator 1B allocates four phase statuses with the difference of substantially π/2 with superior accuracy. The output constellation shown in FIG. 12 shows the penalty of 0.4 dB which is comparable of the penalty of 1.1 dB attributed to that shown in FIG. 10. Based on detail analyses of the arrangement shown in FIG. 12, the penalty is primarily seemed to be due to the optical loses caused in the optical waveguides, 22 to 33.

The phase presetters, 29 and 39, and the phase shifter 30 of the present embodiment have an advantage that the increment of the optical loss by the application of the biases or the signals becomes avoidable. Thus, the degradation of the transmission quality due to the optical loss may be suppressed. The embodiment shown in FIG. 11 provides the phase presetters, 29 and 39, and the phase shifter 50 with the arrangement to lengthen the physical dimension of the optical waveguide. However, a combination of the arrangement, that is, the some of the phase presetters and the phase shifter provides the arrangement shown in FIG. 11 and rest of them provide the arrangement attributed to the QPSK modulator 1A, is implemented in the MZ-modulator.

Second Modification

Figure 13:
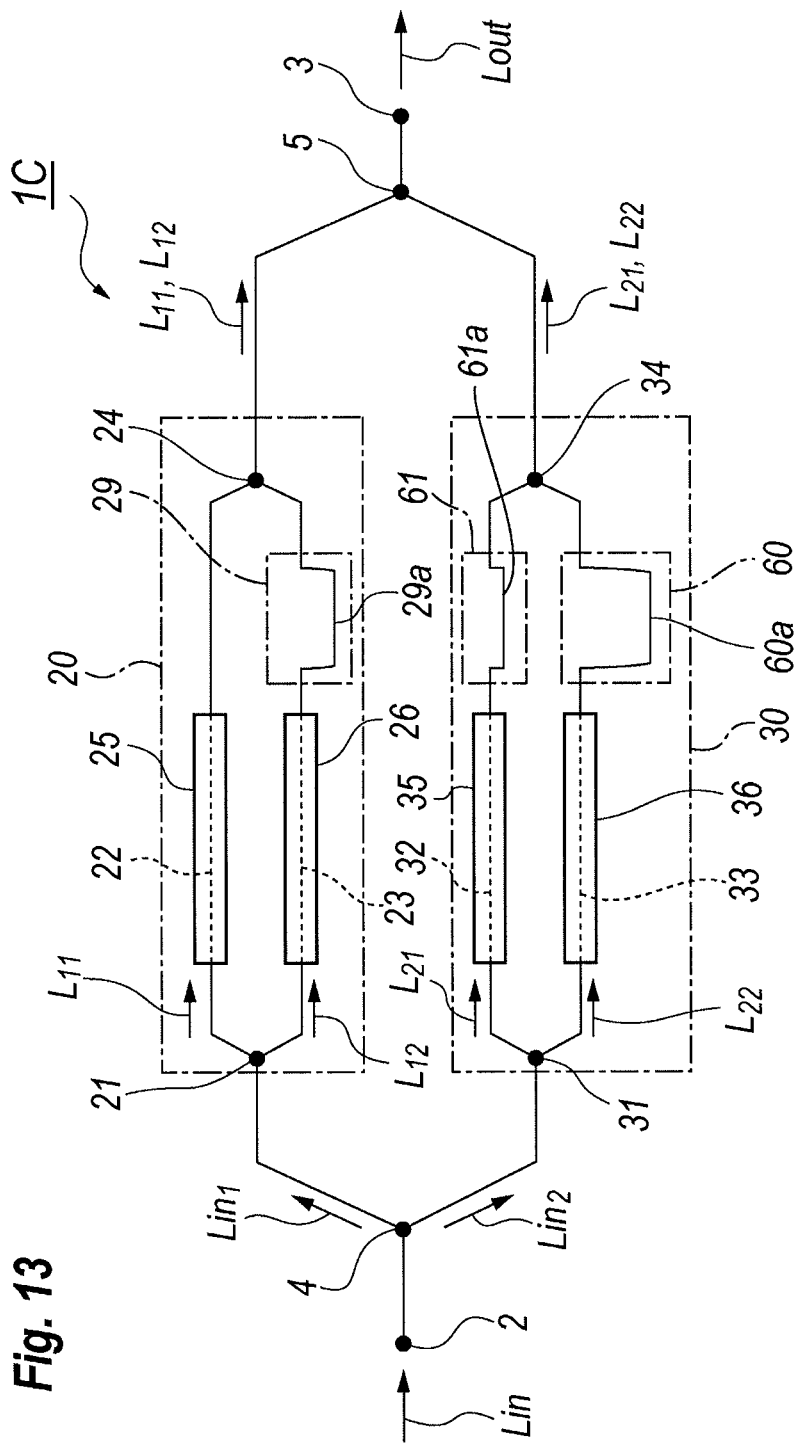
FIG. 13 is a plan view of still another embodiment of a QPSK modulator made of semiconductor material, which is modified from that shown in FIG. 11.

FIG. 13 is a plan view of still another embodiment of a QPSK modulator 1C made of semiconductor material, which is modified from that 1B of aforementioned embodiment. The QPSK modulator 1C has a feature distinguishable from the aforementioned modulator 1B that the second MZ-modulator 30 provides, in addition to the phase presetter 60 in the lower arm waveguide 33, another phase presetter 61 in the upper arm waveguide 32. That is, the MZ-modulator 30 provides two phase presetters, 60 and 61, in respective arm waveguides, 32 and 33. The QPSK modulator 1C of the embodiment further provides a feature that the QPSK modulator 1C does not provide the phase shifter in the downstream of the second MZ-modulator 30.

The phase presetter 60 includes an optical waveguide 60a to lengthen the optical length of the lower arm waveguide 33 between the optical branch 31 and the optical coupler 34 by a length corresponding to the phase shift of 3π/2. On the other hand, the phase presetter 61 provided in the upper arm waveguide 32 lengthens the optical length between the optical branch 31 and the optical coupler 34 by a length corresponding to the phase shift of π/2. Then, the composite optical beam output from the optical coupler 34 cause a phase shift by π/2 with respect to the composite optical beam output from the optical coupler 24. Moreover, the optical beam $L_{22}$ propagating in the lower arm waveguide 33 causes the phase shift of π with respect to the optical beam $L_{21}$ propagating in the upper arm 32.

Thus, the phase presetters, 29, 60, and 61, causes the phase offset of π/2, 2π/2, and 3π/2, between optical beams, $L_{11}$ to $L_{22}$. Accordingly, the composite optical beam output from the optical coupler 5 has the QPSK mode with the phase statuses of π/4, 3π/4, 5π/4, and 7π/4. The phase presetters, 29, 60, and 61, of the present embodiment have the arrangement to include the optical waveguides, 29a, 60a, and 61a, but some of them may include an electrode to modify the refractive index of the optical waveguide.

Figure 14:
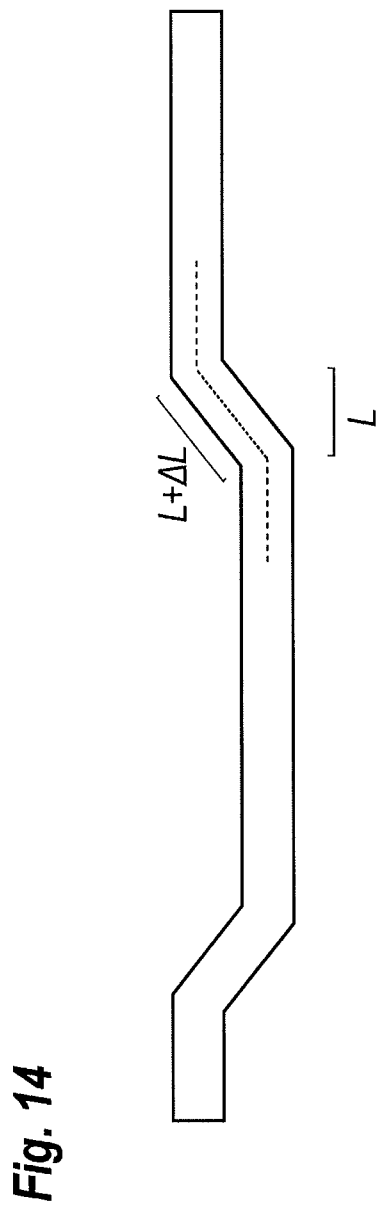
FIG. 14 is a magnified plan view of the waveguides implemented within the QPSK modulators shown in FIGS. 11 and 13.

The optical length of the optical waveguides, 29a, 39a, 60a, and 61a, appeared in aforementioned embodiments may be determined as follows. That is, as shown in FIG. 14, which is a magnified plan view of the waveguides, 29a, 39a, 60a, and 61a, the length thereof is adjustable only by varying a physical length of the inclined portion. Assuming a supplemental physical length ΔL is added to the inclined portion whose horizontal length is L, the phase shift Δφ by this elongated length ΔL becomes:

$$\Delta\phi = 2 \times \Delta L \times n_{\mathit{eff}} / \lambda,$$

where $n_{\mathit{eff}}$ is equivalent refractive index of the base semiconductor material. Assuming that the base semiconductor material is InP, namely, the MZ-modulator is made of InP, the equivalent refractive index $n_{\mathit{eff}}$ is 3.3. Further assuming that the wavelength to be considered is 1550 nm, and the inclined angle is 45°, the supplemental length ΔL for the phase shift of π/2, 2π/2, and 3π/2 are given by 180 nm, 370 nm, and 550 m, respectively.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A Mach-Zehnder modulator, comprising:
    an optical branch configured to divide an input optical beam into two optical beams;
    a pair of arm waveguides, each arm waveguide being made of semiconductor material including at least one of InP and GaAs, the arm waveguides propagating respective optical beams divided by the optical branch;
    a phase presetter provided in one of the arm waveguides to vary a phase of the optical beam propagating therein by Π; and
    an optical coupler configured to couple the optical beams output from the respective arm waveguides,
    wherein the arm waveguides are driven by modulation signals complementary to each other, the arm waveguides shifting the phase of the optical beams between 0 and Π radians in response to the amplitude of the modulation signals, and
    wherein the arm waveguides have a non-linear characteristic between the phase shift for the optical beam propagating therein and the amplitude of the modulation signals.

2. The Mach-Zehnder modulator of claim 1,
    wherein the arm waveguides provide respective electrodes to receive the modulation signals, and
    wherein the phase presetter is upstream of the electrode of one of the arm waveguides.

3. The Mach-Zehnder modulator of claim 1,
   wherein the arm waveguides provide respective electrodes to receive the modulation signals, and
   wherein the phase presetter is downstream of the electrode of one of the arm waveguides.
4. The Mach-Zehnder modulator of claim 1,
   wherein the phase presetter includes a waveguide with an electrode by which a bias to vary the phase of the optical beam propagating in the waveguide thereof by Π is provided.
5. The Mach-Zehnder modulator of claim 1,
   wherein the arm waveguide providing the phase presetter has a portion for providing an optical waveguide for the phase presetter and a remaining portion, and
   wherein the optical waveguide included in the phase presetter and the remaining portion of the arm waveguide providing the phase presetter have a total length different from a length of the other of the arm waveguides without the phase presetter by a supplemental length corresponding to the phase of Π for the optical beam propagating in the phase presetter.
6. An optical modulator operable in a quadrature phase shift keying (QPSK) mode, comprising:
   an optical branch configured to divide an input optical beam into two portions,
   a first Mach-Zehnder modulator for modulating a phase of one portion of the input optical beam;
   a second Mach-Zehnder modulator for modulating a phase of the other portion of the input optical beam, wherein the first and second Mach-Zehnder modulators are made of semiconductor material including at least one of InP and GaAs and provide a pair of arm waveguides, one of the arm waveguides providing a phase presetter to shift the phase of the optical beam portion propagating therein;
   a phase shifter downstream of the second Mach-Zehnder modulator, the phase shifter shifting the phase of the other portion of the input optical beam by Π/2; and
   an optical coupler configured to couple the portion of the input optical beam modulated by the first Mach-Zehnder modulator with the other portion of the input optical beam modulated by the second Mach-Zehnder modulator and passing the phase shifter,
   wherein the arm waveguides in the first Mach-Zehnder modulator and the arm waveguides of the second Mach-Zehnder modulator are driven by modulation signals complementary to each other and shift the phase of each of the optical beam portions in response to the amplitude of the modulation signals, and
   wherein the arm waveguides have a non-linear characteristic between the phase shift for the optical beam propagating therein and the amplitude of the modulation signals.
7. The optical modulator of claim 6,
   wherein at least one of the phase presetter in the first Mach-Zehnder modulator and the phase presetter in the second Mach-Zehnder modulator provides an optical waveguide with an electrode supplied with a bias to shift a phase of the optical beam propagating therein by Π.
8. The optical modulator of claim 6,
   wherein at least one of the phase presetter in the first Mach-Zehnder modulator and the phase presetter in the second Mach-Zehnder modulator provides an optical waveguide for the presetter and a remaining portion, and
   wherein the optical waveguide included in the phase presetter and the remaining portion of the arm waveguide providing the phase presetter have a total length different from a length corresponding to a phase of Π for the optical beam propagating in the phase presetter.
9. The Mach-Zehnder modulator of claim 1,
   wherein the modulation signals provided to the respective arm waveguides have averages substantially equal to each other.
10. A Mach-Zehnder modulator, comprising:
    an optical branch configured to divide an input optical beam into two optical beams;
    a pair of arm waveguides, each arm waveguide being made of a group III-V semiconductor material, the arm waveguides propagating respective optical beams divided by the optical branch;
    a phase presetter provided in one of the arm waveguides to vary a phase of the optical beam propagating therein by Π; and
    an optical coupler configured to couple the optical beams output from the respective arm waveguides,
    wherein the arm waveguides are driven by modulation signals complementary to each other,
    wherein the arm waveguide providing the phase presetter has a portion for providing an optical waveguide for the phase presetter and a remaining portion, and
    wherein the optical waveguide included in the phase presetter and the remaining portion of the arm waveguide providing the phase presetter have a total length different from a length of the other of the arm waveguides without the phase presetter by a supplemental length corresponding to the phase of Π for the optical beam propagating in the phase presetter.
11. The Mach-Zehnder modulator of claim 10,
    wherein the arm waveguides provide respective electrodes to receive the modulation signals, and
    wherein the phase presetter is upstream of the electrode of one of the arm waveguides.
12. The Mach-Zehnder modulator of claim 10,
    wherein the arm waveguides provide respective electrodes to receive the modulation signals, and
    wherein the phase presetter is downstream of the electrode of one of the arm waveguides.
13. The Mach-Zehnder modulator of claim 10,
    wherein the phase presetter includes a waveguide with an electrode by which a bias to vary the phase of the optical beam propagating in the waveguide thereof by ii is provided.
14. The Mach-Zehnder modulator of claim 10,
    wherein the modulation signals provided to the respective arm waveguides have averages substantially equal to each other.
15. A method of driving a Mach-Zehnder modulator that comprises; an optical branch configured to divide an input optical beam into two optical beams; a pair of arm waveguides, each arm waveguide being made of semiconductor material including at least one of InP and GaAs, the arm waveguides propagating respective optical beams divided by the optical branch; a phase presetter provided in one of the arm waveguides to vary a phase of the optical beam propagating therein by Π; and an optical coupler configured to couple the optical beams output from the respective arm waveguides, wherein the arm waveguides are driven by modulation signals complementary to each other, the arm waveguides shifting the phase of the optical beams between 0 and Π radians in response to the amplitude of the modulation signals, and wherein the arm waveguides have a non-linear characteristic between the phase shift for the optical beam propagating therein and the amplitude of the modulation signals, said method comprising steps of:

supplying a bias to the phase presetter to vary a phase of an optical beam propagating therein substantially by Π;

supplying biases substantially equal to each other to the arm waveguides; and supplying modulation signals complementary to each other to drive the arm waveguides, the modulation signals each having swing ranges substantially equal to each other.

* * * * *